US008141728B1

(12) United States Patent
Dahler et al.

(10) Patent No.: US 8,141,728 B1
(45) Date of Patent: Mar. 27, 2012

(54) INFANT FEEDING SYSTEM AND METHOD

(76) Inventors: Sarah J. Dahler, Oak Park, MN (US); Nicholas J. Dahler, Oak Park, MN (US)

( * ) Notice: Subject to any disclaimer, the term of this patent is extended or adjusted under 35 U.S.C. 154(b) by 291 days.

(21) Appl. No.: 12/479,822

(22) Filed: Jun. 7, 2009

(51) Int. Cl.
*B62J 11/00* (2006.01)

(52) U.S. Cl. ..................... 215/11.4; 215/11.1; 215/11.6; 215/388; 224/414

(58) Field of Classification Search ................. 215/11.4, 215/11.1, 11.6, 388; 137/147; 222/145, 222/175, 1, 113, 209
See application file for complete search history.

(56) References Cited

U.S. PATENT DOCUMENTS

| | | | | |
|---|---|---|---|---|
| 5,460,161 | A * | 10/1995 | Englehart et al. | 126/344 |
| 5,728,137 | A * | 3/1998 | Anderson-Fignon | 606/234 |
| 6,923,332 | B1 * | 8/2005 | Thomas | 215/11.1 |

* cited by examiner

*Primary Examiner* — Anthony Stashick
*Assistant Examiner* — Cynthia Collado
(74) *Attorney, Agent, or Firm* — Dave Alan Lingbeck

(57) ABSTRACT

An infant feeding system for feeding an infant seated especially in a car seat with the bottle sitting in a cup holder. The infant feeding system includes a bottle assembly including a bottle and a cap removably fastened to the bottle, and also includes a feeding assembly being positioned for transporting fluid therethrough from the bottle to an infant.

6 Claims, 2 Drawing Sheets

INFANT FEEDING SYSTEM AND METHOD

BACKGROUND OF THE INVENTION

1. Field of the Invention

The present invention relates to feeding systems and more particularly pertains to a new infant feeding system for conveniently feeding an infant seated especially in a car seat with the bottle sitting in a cup holder.

2. Description of the Prior Art

The use of feeding systems is known in the prior art. More specifically, feeding systems heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a bottle, an elongate feeding tube having a portion extending inside the bottle and also includes a pacifier being pivotally attached to an end of the elongate tube with the bottle being positioned so that fluid is fed by gravity. Another prior art includes a bottle, an elongate tube, and a nipple being attached to a mouth guard with the fluid from the bottle being gravity fed. Yet another prior art includes a bottle being support by a bracket and also includes an elongate feeding tube connected to the bottle with a nipple being attached to the end of the elongate tube with the fluid being gravity fed.

While these devices fulfill their respective, particular objectives and requirements, the aforementioned patents do not disclose a new infant feeding system.

SUMMARY OF THE INVENTION

The general purpose of the present invention, which will be described subsequently in greater detail, is to provide a new infant feeding system which has many of the advantages of the feeding systems mentioned heretofore and many novel features that result in a new infant feeding system which is not anticipated, rendered obvious, suggested, or even implied by any of the prior art feeding systems, either alone or in any combination thereof. The present invention includes a bottle assembly including a bottle and a cap removably fastened to the bottle, and also includes a feeding assembly being removably disposed to the bottle assembly for transporting fluid therethrough from the bottle to an infant. None of the prior art includes the combination of the elements of the present invention.

There has thus been outlined, rather broadly, the more important features of the infant feeding system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new infant feeding system which has many of the advantages of the feeding systems mentioned heretofore and many novel features that result in a new infant feeding system which is not anticipated, rendered obvious, suggested, or even implied by any of the prior art feeding systems, either alone or in any combination thereof.

Still another object of the present invention is to provide a new infant feeding system for feeding an infant seated especially in a car seat with the bottle sitting in a cup holder thus preventing leakage from the nipple should the nipple fall out of the infant's mouth which is a problem with the prior art gravity dispensing feeding systems.

Still yet another object of the present invention is to provide a new infant feeding system that allows an infant to be fed while seated in a car seat without the parent having to reach back and support the bottle.

Even still another object of the present invention is to provide a new infant feeding system that primes the feeding tube with fluid from the bottle to the nipple to prevent the infant from first sucking in air.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
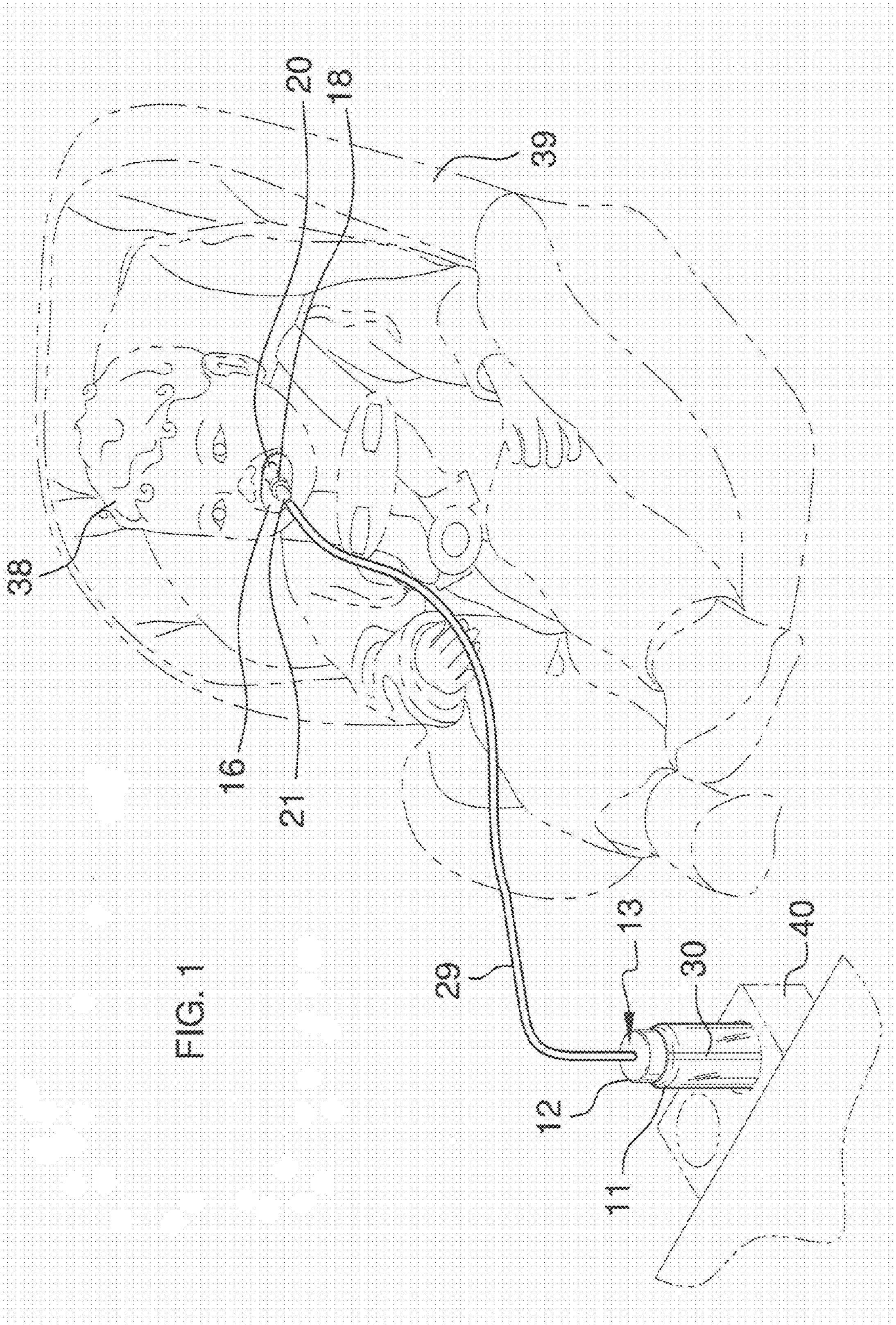
FIG. 1 is a top perspective view of a new infant feeding system according to the present invention with an infant seated in a car seat.
Figure 2:
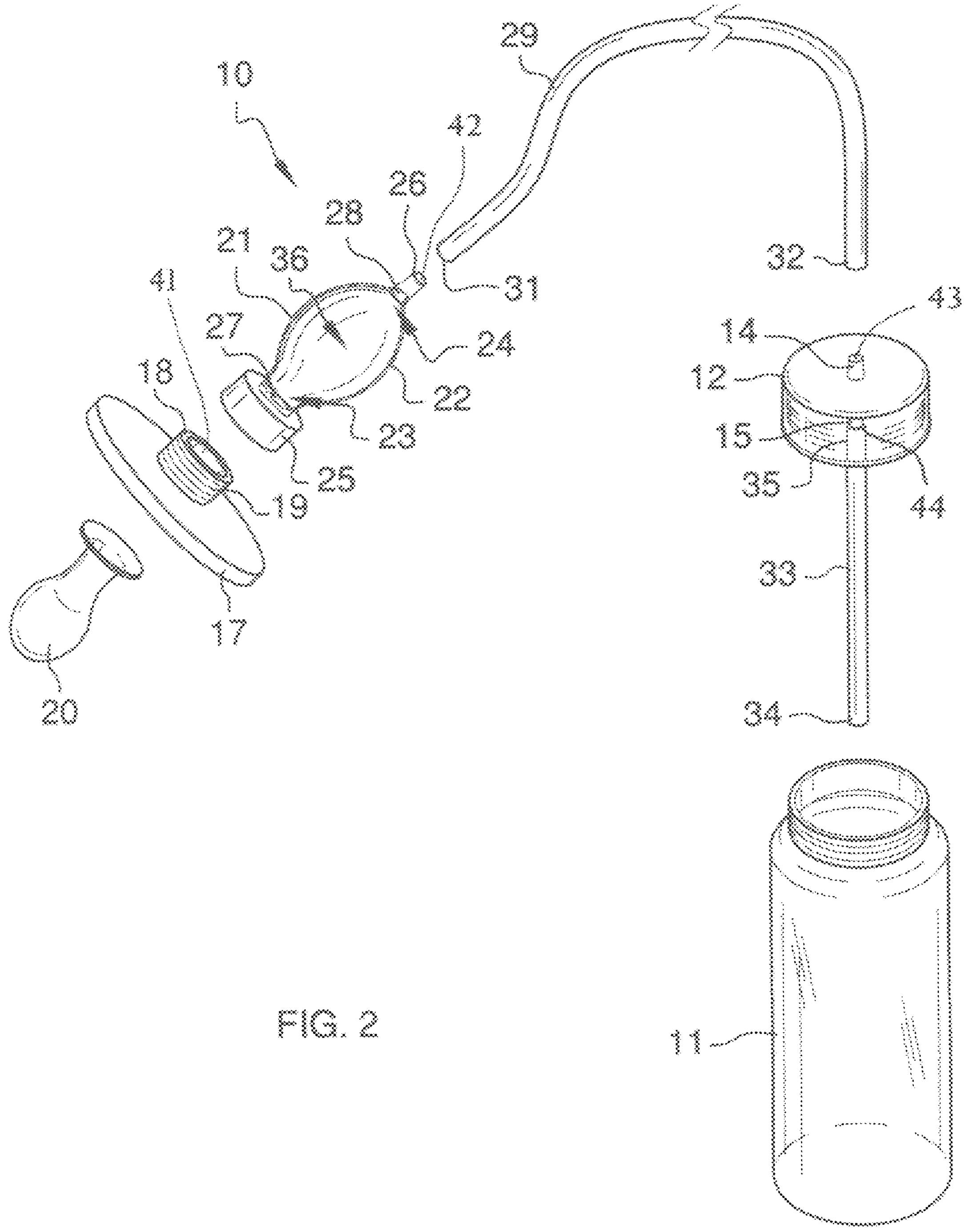
FIG. 2 is an exploded perspective view of the present invention with a longitudinal cross-section of the pump.

With reference now to the drawings, and in particular to FIGS. 1 through 2 thereof, a new infant feeding system embodying the principles and concepts of the present invention and generally designated by the reference numeral 10 will be described.

As best illustrated in FIGS. 1 through 2, the infant feeding system 10 generally comprises a bottle assembly including a bottle 11 and a cap 12 removably and conventionally fastened to the bottle 11, and also comprises a feeding assembly being removable from and in fluid communication with the bottle assembly for transporting fluid therethrough from the bottle 11 to an infant 38. The feeding assembly includes at least one flexible elongate tubular member 29,33 being removable from and in fluid communication with the bottle 11, and also includes a squeeze pump 21 being removably connected to the at least one flexible elongate tubular member 29,33 for priming fluid from the bottle 11 through the squeeze pump 21, and further includes a pacifier 16 being removably and conventionally connected to the squeeze pump 21. The pacifier 16 includes a shield 17 having a first connector 18 being conventionally attached thereto and also includes a nipple 20 being removably supported by and conventionally attached to the shield 17. The first connector 18 is a male connector having a bore 41 being disposed therethrough and also having threads 19 being conventionally disposed about a circumference thereof.

The squeeze pump 21 includes a flexible bulb 22 having first and second open ends 23,24, and also includes a second connector 25 being conventionally disposed at the first open end 23, and further includes a third connector 26 being conventionally disposed at the second open end 24. The flexible bulb 22 has a fluid passageway 36 being disposed therethrough and also has a first flexible one-way valve 27 being conventionally disposed therein at the first open end 23 and further has a second flexible one-way valve 28 being conventionally disposed therein at the second open end 24. The first and second flexible one-way valves 27,28 are essentially membranes having portions which are hingedly attached to the flexible bulb 22 and open and close in one direction over the first and second open ends 23,24 respectively. The third connector 26 is a male connector having a bore 42 being disposed therethrough, and the second connector 25 is a threaded female connector being removably and conventionally fastened to the first connector 18.

A first flexible elongate tubular member 29 has a first portion 30 being removably disposed through a hole 13 in the cap 12 and into the bottle 11, and has a second open end 31 being removably and conventionally connected to the third connector 26.

As a second embodiment, a first flexible elongate tubular member 29 has a first open end 32 being removably and conventionally connected to the cap 12, and also includes a second open end 31 being removably and conventionally connected to the third connector 26. The cap 12 includes a fourth connector 14 being conventionally attached to a top side of the cap 12 and has a bore 43 being disposed therethrough with the fourth connector 14 being removably received in the first open end 32 of the first elongate flexible tubular member 29. Also, a second flexible elongate tubular member 33 is removably disposed in the bottle 11 and has a first open end 34 being disposed near a bottom of the bottle 11 and also has a second open end 35 being removably and conventionally connected to the cap 12. The cap 12 includes a fifth connector 15 being conventionally attached to a bottom side of the cap 12 and has a bore 44 being disposed therethrough with the fifth connector 15 being removably received in the second open end 35 of the second flexible elongate tubular member 33.

In use, the cap 12 is removed and fluid is put into the bottle 11. The bottle 11 is then disposed by placing the bottle 11 in a hands free position to prevent the fluid from being gravitationally dispensed from the bottle 11 through the pacifier 16. In particular, with the infant 38 being seated in a car seat 39 in a vehicle, the bottle 11 is placed upright in a cup holder 40 to prevent the uninhibited gravitational dispensing of the fluid from the bottle 11 through the pacifier 16. The fluid in the bottle 11 is then primed to the nipple 20 through one or more flexible elongate tubular members 29,33 so that the infant 38 doesn't suck in any air and also to make it easier for the infant 38 to drink the fluid from the bottle 11. The squeeze pump 21 is repeatedly squeezed to urge the fluid from the bottle 11 through the one or more flexible elongate tubular members 29,33 and through the squeeze pump 21 to the nipple 20. Whereupon, the nipple 20 is inserted into the mouth of the infant 38 for the infant 38 to suck on the nipple 20 to receive the fluid through the one or more flexible elongate tubular members 29,33 without the bottle 11 having to be inverted for gravitational dispensation of the fluid.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the infant feeding system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An infant feeding system as comprising:

a bottle assembly including a bottle and a cap removably fastened to said bottle; and a feeding assembly being disposed to transport fluid therethrough from said bottle to an infant and including at least one flexible elongate tubular member being in fluid communication with said bottle, and also including a squeeze pump being in fluid communication with said at least one flexible elongate tubular member for priming fluid from said bottle through said squeeze pump, and further including a pacifier being in fluid communication with said squeeze pump, said pacifier having a first connector being attached thereto, said squeeze pump being removably connected to said pacifier and includes a flexible bulb having first and second open ends, and also includes a second connector being disposed at said first open end, and further includes a third connector being disposed at said second open end, wherein said third connector is a male connector having a bore disposed therethrough, and said second connector is a threaded female connector and is fastenable to said first connector, said squeeze pump being fastenable to said pacifier.

2. An infant feeding system as comprising:

a bottle assembly including a bottle and a cap removably fastened to said bottle; and a feeding assembly being disposed to transport fluid therethrough from said bottle to an infant and including at least one flexible elongate tubular member being in fluid communication with said bottle, and also including a squeeze pump being in fluid communication with said at least one flexible elongate tubular member for priming fluid from said bottle through said squeeze pump, and further including a pacifier being in fluid communication with said squeeze pump, said pacifier having a first connector being attached thereto, said squeeze pump being removably connected to said pacifier and includes a flexible bulb having first and second open ends, and also includes a second connector being disposed at said first open end, and further includes a third connector being disposed at said second open end, wherein said at least one flexible elongate tubular member includes a first flexible elongate tubular member having a first portion being removably disposed through a hole in said cap and into said bottle, and has a second end being removably connected to said third connector.

3. An infant feeding system as comprising:

a bottle assembly including a bottle and a cap removably fastened to said bottle; and a feeding assembly being disposed to transport fluid therethrough from said bottle to an infant and including at least one flexible elongate tubular member being in fluid communication with said bottle, and also including a squeeze pump being in fluid communication with said at least one flexible elongate tubular member for priming fluid from said bottle through said squeeze pump, and further including a pacifier being in fluid communication with said squeeze pump, said pacifier having a first connector being attached thereto, said squeeze pump being removably connected to said pacifier and includes a flexible bulb having first and second open ends, and also includes a second connector being disposed at said first open end, and further includes a third connector being disposed at said second open end, wherein said at least one flexible elongate tubular member includes a first flexible elongate tubular member having a first open end being removably connected to said cap, and also includes a second open end being removably connected to said third connector.

4. The infant feeding system as described in claim 3, wherein said cap includes a fourth connector being attached to a top side of said cap and has a bore being disposed therethrough, said fourth connector being removably received in said first open end of said first elongate flexible tubular member.

5. The infant feeding system as described in claim 3, wherein said at least one flexible elongate tubular member includes a second flexible elongate tubular member being removably disposed in said bottle and having a first open end being disposed near a bottom of said bottle and also having a second open end being removably connected to said cap.

6. The infant feeding system as described in claim 5, wherein said cap includes a fifth connector being attached to a bottom side of said cap and has a bore being disposed therethrough, said fifth connector being removably received in said second open end of said second flexible elongate tubular member.

* * * * *